(12) United States Patent
Flick et al.

(10) Patent No.: US 10,937,460 B2
(45) Date of Patent: Mar. 2, 2021

(54) MEDIA FILES AND PROTOCOLS SUPPORTING RUNTIME DEPENDENT TRACKS

(71) Applicant: Apple Inc., Cupertino, CA (US)

(72) Inventors: Christopher Flick, San Jose, CA (US); Kevin Calhoun, Santa Rosa, CA (US)

(73) Assignee: Apple Inc., Cupertino, CA (US)

( * ) Notice: Subject to any disclaimer, the term of this patent is extended or adjusted under 35 U.S.C. 154(b) by 685 days.

(21) Appl. No.: 15/612,263

(22) Filed: Jun. 2, 2017

(65) Prior Publication Data

US 2017/0357649 A1    Dec. 14, 2017

Related U.S. Application Data

(60) Provisional application No. 62/347,984, filed on Jun. 9, 2016.

(51) Int. Cl.
| | | |
|---|---|---|
| *G06F 17/00* | (2019.01) | |
| *G11B 27/02* | (2006.01) | |
| *G11B 27/19* | (2006.01) | |
| *G11B 27/30* | (2006.01) | |

(52) U.S. Cl.
CPC ............ *G11B 27/02* (2013.01); *G11B 27/19* (2013.01); *G11B 27/309* (2013.01)

(58) Field of Classification Search
CPC ........ G11B 27/02; G11B 27/19; G11B 27/309
See application file for complete search history.

(56) References Cited

U.S. PATENT DOCUMENTS

| | | | |
|---|---|---|---|
| 5,497,241 A * | 3/1996 | Ostrover ................ | G10H 1/361 386/201 |
| 8,365,060 B2 | 1/2013 | Wang et al. | |
| 8,768,984 B2 | 7/2014 | Priddle et al. | |
| 8,976,871 B2 | 3/2015 | Chen et al. | |
| 8,996,547 B2 * | 3/2015 | Bocharov .......... | H04N 21/6581 707/758 |
| 2004/0093220 A1 * | 5/2004 | Kirby ..................... | H04N 5/278 704/278 |
| 2006/0291806 A1 * | 12/2006 | Ikeda ................ | G11B 20/10527 386/241 |
| 2007/0110400 A1 * | 5/2007 | Kim ....................... | G11B 27/34 386/244 |
| 2010/0100899 A1 * | 4/2010 | Bradbury ............ | H04L 65/4076 725/29 |
| 2010/0153395 A1 | 6/2010 | Hannuksela et al. | |

(Continued)

*Primary Examiner* — Tyler J Torgrimson
(74) *Attorney, Agent, or Firm* — BakerHostetler (57) ABSTRACT

Embodiments of the present disclosure provide techniques for rendering content from a media item. According to these embodiments, from a file of the media item, track(s) in a group data structure corresponding to the type of content are identified as candidate track(s). From other tracks in the file, a determination may be made whether another track corresponds to the type of content. When another track corresponds to the type of content, feature tags in the file that are associated may be compared with the other track to capabilities of a player device that is to render the type of content. When the feature tags match capabilities of the player device, the other track may be included as a candidate track. Thereafter, a track may be selected from the candidate tracks and rendered by the player device.

25 Claims, 5 Drawing Sheets

(56) References Cited

U.S. PATENT DOCUMENTS

| | | | | |
|---|---|---|---|---|
| 2016/0173551 A1* | 6/2016 | Mueller | ............. | H04L 65/1093 |
| | | | | 709/219 |
| 2016/0231872 A1* | 8/2016 | Tamura | ................ | G06F 1/1694 |
| 2017/0318335 A1* | 11/2017 | Ding | ................ | H04N 21/26603 |
| 2018/0367592 A1* | 12/2018 | Thomas | ................ | H04L 65/601 |
| 2019/0342356 A1* | 11/2019 | Thomas | ........... | H04N 21/23430 |
| 2020/0135225 A1* | 4/2020 | Vaughn | .................. | G10L 21/10 |

* cited by examiner

MEDIA FILES AND PROTOCOLS SUPPORTING RUNTIME DEPENDENT TRACKS

CLAIM FOR PRIORITY

The present application benefits from priority of U.S. application Ser. No. 62/347,984, filed on Jun. 9, 2016 and entitled "Media Files and Protocols Supporting Runtime Dependent Tracks," the disclosure of which is incorporated herein in its entirety.

BACKGROUND

The present disclosure describes an extension to media file syntax and protocols, such as the QuickTime and .m4v movie file formats, to support multiple tracks that can advertise requirements they have on the runtime (e.g., player devices) for their use. This design arises out of media producers' (for example, iTunes Store) desire to deliver a movie file with multiple Web Video Text Tracks (WebVTT) subtitle tracks for the same language and media characteristics but for which one of the tracks requires a later version of media runtimes for its correct playback. The later version might offer bug fixes, additional authoring richness, or another feature that the earlier version lacks. By allowing "legacy" tracks to coexist with newer tracks, the "best" track can be chosen and presented on each version of the platform. For the media producer, this allows fewer movie files to be produced, delivered, and managed. Otherwise, each variation would require duplication of the same video and audio, differing only in the fairly small contribution of subtitle and other legible tracks.

DETAILED DESCRIPTION

Embodiments of the present disclosure provide techniques for rendering content from a media item. According to these embodiments, from a file of the media item, track(s) in a group data structure corresponding to the type of content are identified as candidate track(s). From other tracks in the file, a determination may be made whether another track corresponds to the type of content. When another track corresponds to the type of content, feature tags in the file that are associated may be compared with the other track to capabilities of a player device that is to render the type of content. When the feature tags match capabilities of the player device, the other track may be included as a candidate track. Thereafter, a track may be selected from the candidate tracks and rendered by the player device.

1. Introduction

Figure 1:
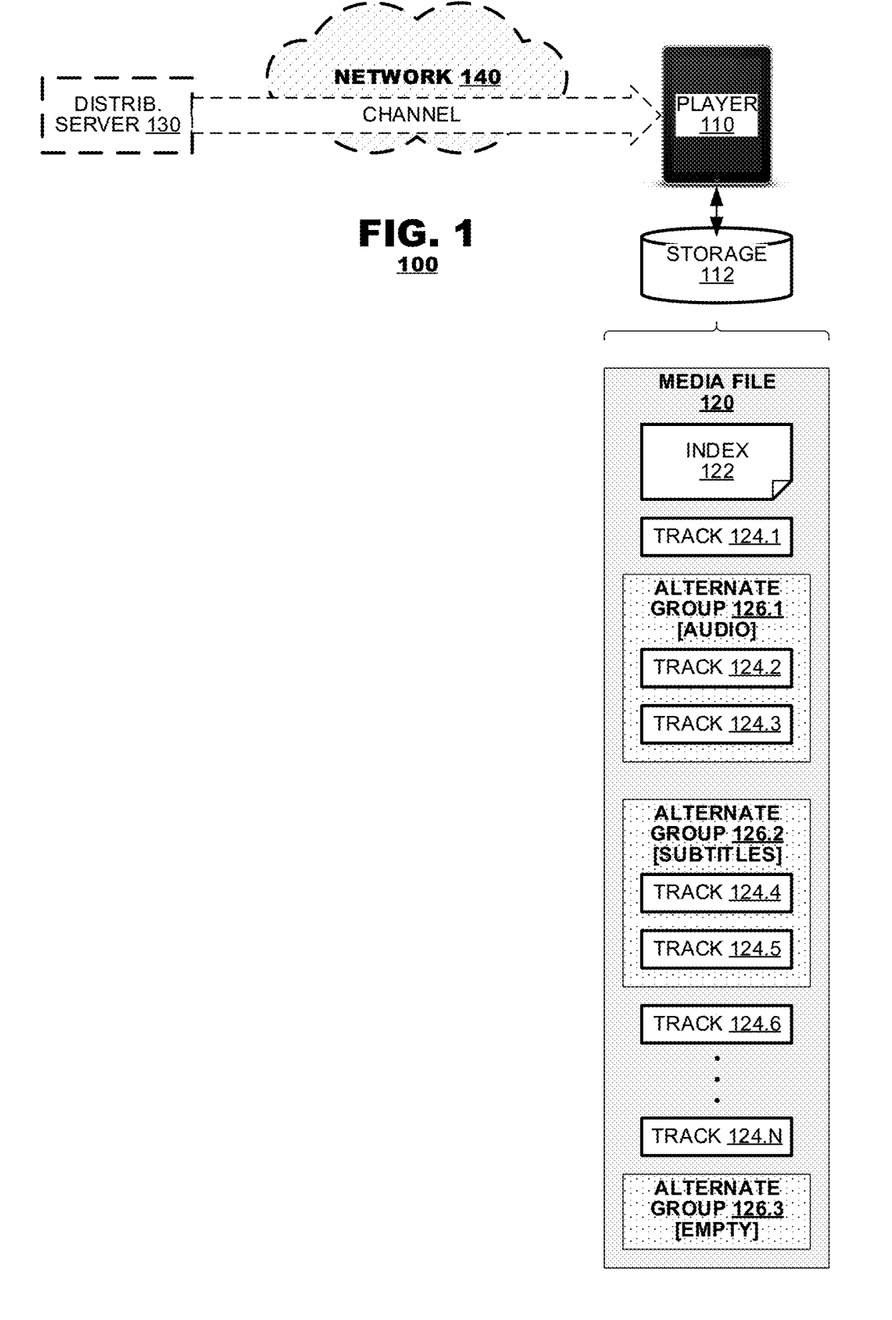
FIG. 1 illustrates a system according to an embodiment of the present disclosure.

FIG. 1 illustrates a system 100 according to an embodiment of the present disclosure. The system 100 may include a player device 110 that stores media files 120 for rendering in a local storage device 112. Each media file 120 may represent a separate media item, for example, a movie, television show or the like. The media files 120 may include an index portion 122 and a plurality of tracks 124.1-124.N. The player 110 (sometimes called the "runtime" herein) may select tracks 124.1-124.N for playback automatically or under operator control.

The various tracks 124.1-124.N may provide different representations of content of the media file 120. The media file 120 may contain tracks 124.2-124.3 that represent audio content of the media file, for example, audio of different languages. Other tracks 124.4-124.5 may represent other content of the media file, for example, subtitles in different languages, audio with narration, etc. Selection of tracks for rendering may be made in response to user control or based on configuration settings stored by the player 110.

The tracks 124.1-124.N typically include content that has been coded according to respective coding protocols. The player 110 may include audio and video decoders (commonly, "codecs") (not shown) to decode coded data of the tracks according to those protocols.

Select tracks may be organized into "alternate groups" 126.1, 126.2, 126.3 within a media file 120, which indicates that the tracks within an alternate group are alternatives for each other. Alternate groups often are used to group tracks based on type—for example, audible tracks, legible tracks, etc. In one example, an English language track may be organized into an alternate group 126.1 with tracks representing other languages (French, German, Spanish, Japanese, etc.). Typically, at most one of the tracks will be selected for rendering at a given time. It is not required that any track from an alternate group be rendered. In some circumstances, no track from an alternate group would be selected for rendering (for example, presentation of subtitles may be disabled during rendering).

A media file may have several alternate groups 126.1, 126.2, 126.3 defined within it. For example, in addition to audio, it may be convenient to group different representations of closed caption information into a further alternate group (not shown). A media file may include other tracks 124.1, 124.6, 124.n that are not included within any alternate group 126.1, 126.2, 126.3.

It is permissible under many file formats to have an alternate group 126.3 defined within a media file that is empty—it contains no tracks.

In an embodiment, the media file 120 may be stored to the player device 110 by a distribution server 130 that transfers the media file 120 to the device via a channel of a communication network 140. Alternatively, the media file 120 may be loaded to the player device 110 from a local storage device. Such implementation differences are immaterial to the present discussion unless noted hereinbelow.

Figure 2:
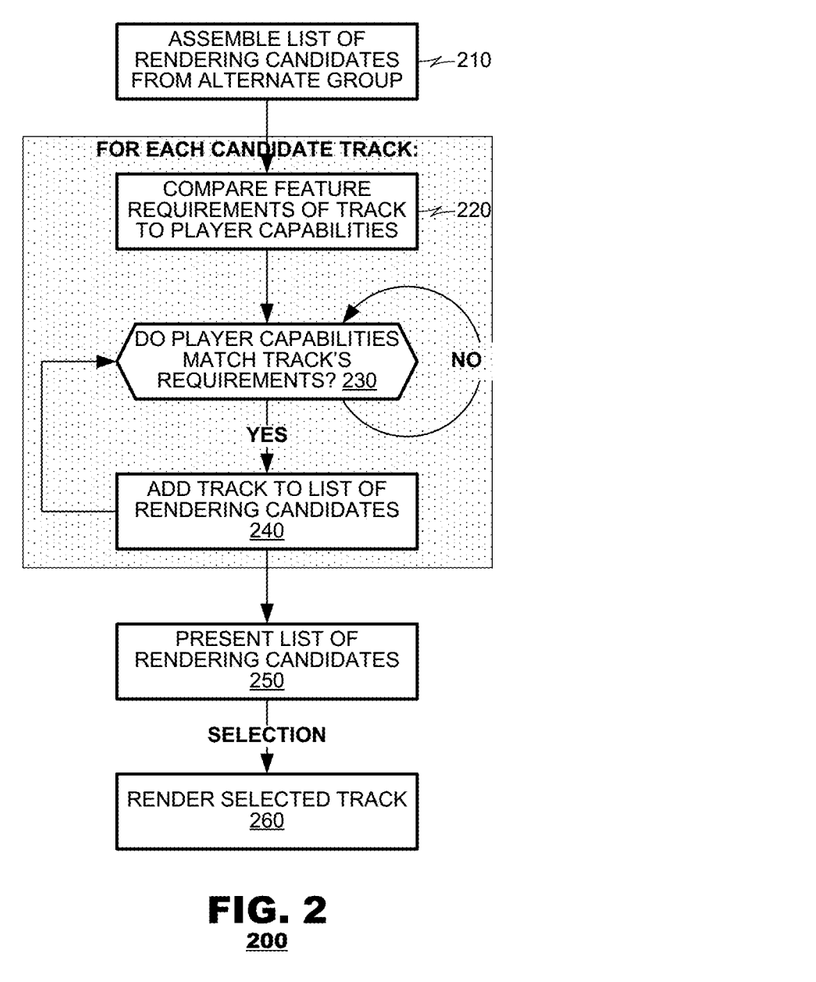
FIG. 2 illustrates a method according to an embodiment of the present disclosure.

In an embodiment, a media file may have one or more tracks 124.n stored therein that are not identified as members of an alternate group 126.1, 126.2, 126.3 but may be added to the alternate group through a discovery process performed at a player 110. FIG. 2 illustrates one such process.

FIG. 2 illustrates a method 200 according to an embodiment of the present disclosure. In the method 200, a player may identify a set of rendering candidates for a type of track. The method 200 may begin by assembling a list of rendering candidates from an alternate group (box 210). In the case of audio data, for example, the method 200 may build a list of audio tracks from an alternate group defined for audio data. The method 200 also may review candidate tracks that are not members of the alternate group and, for each candidate track, compare the feature requirements of the track to the player's capabilities (box 220). If the player's capabilities match the track's requirements (box 230), the method 200 may add the track to the list of rendering candidates (box 240). Once all candidate tracks have been evaluated, the method 200 may present the list of rendering candidates (box 250) and, in response to a selection, render a selected track (box 260).

In an embodiment, for each track, a media file 150 may store data that describes feature requirements, a set of tools that are necessary to render the track. A player 110 also may store data describing its capabilities, which provides a basis for comparison to the feature requirements of the candidate tracks.

Figure 3:
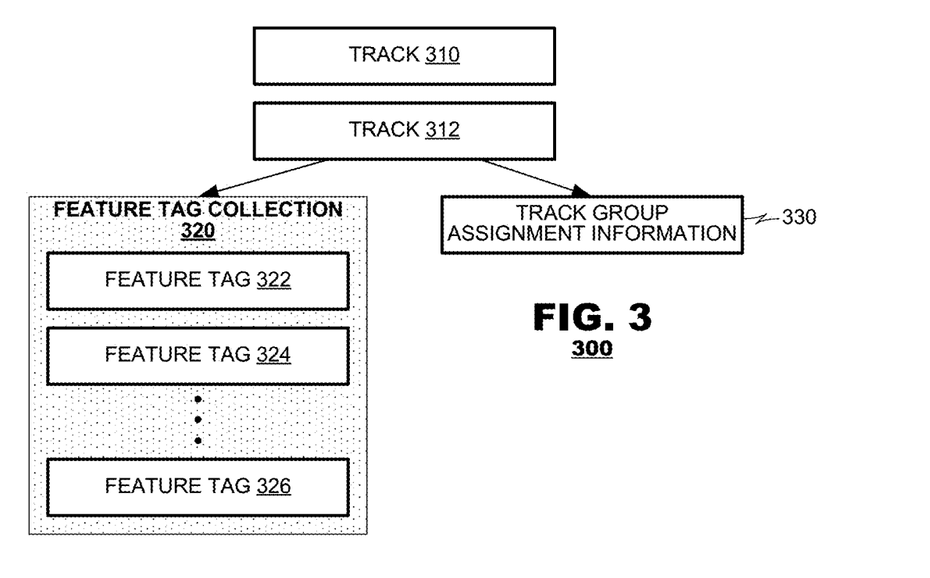
FIG. 3 illustrates an exemplary data structure according to an embodiment of the present disclosure.

FIG. 3 illustrates an exemplary data structure 300 according to an embodiment of the present disclosure. The data structure 300 may find application as part of a media file, such as the file shown in FIG. 1. FIG. 3 illustrates two tracks 310 and 312, which may contain content of the media file. The first track 310 may be considered a non-provisional track and the second track 312 may be considered a provisional track.

The provisional track 312 may have a set 320 of feature tags 322-326 associated with it and a tag 330 representing track group assignment information. The feature tags 322-326 may identify the feature requirements that are needed to render the provisional track 320. These feature tags 322-326 may provide a player a basis for comparison to the player's capabilities; if the player's capabilities match those described in every feature tag 322-326 associated with a given track 312, then the player is capable of rendering that track 312.

Provision of feature tags 322-326 provides authors of media files the capability of delivering a single media file that finds application with a plurality of players, each with different sets of capabilities. Thus, the media file may find application with a continuum of players that are in use at the time the media file initially is released. Moreover, the media file may be extended to be compatible with new players that become available over time with increased capability sets by adding new tracks to the media file with corresponding feature tags. When the author revises a given media file, for example to add a new track that can be rendered only by a new type of player, older players may have capabilities that do not match the set of feature tags that are provided for the new tracks. During rendering operations, players would not recognize the feature tags of track(s) that are associated with incompatible capabilities and, thus, would deem those tracks as unplayable.

Some tracks 310 may have no feature tags assigned to them, for example, tracks of legacy media files that are published prior to advent of the techniques described herein. A player may determine that tracks without feature tags are candidates for playback.

A track group assignment tag 330 may identify an alternate group to which the track 312 is to be added, provided a player's capabilities match those of the track's feature tags 322-326.

Figure 4:
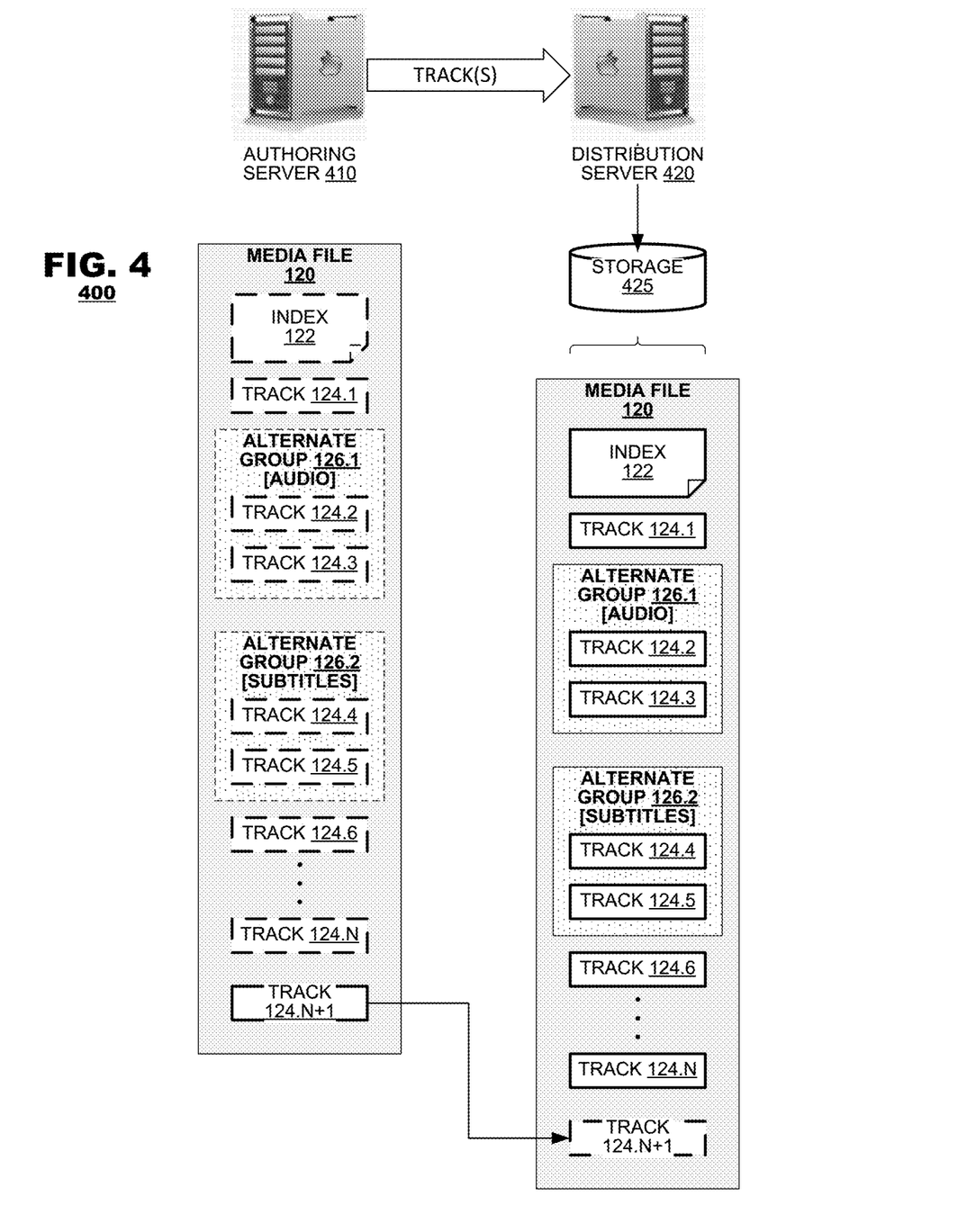
FIG. 4 illustrates a media distribution system according to an embodiment of the present disclosure.

FIG. 4 is a block diagram of a media distribution system 400 according to an embodiment of the present disclosure. The system 400 may include an authoring server 410 and a distribution server 420. The authoring server 410 may be a server that creates media items that may be distributed to player devices (FIG. 1) by the distribution server 420 and, according to embodiments of the present discussion, to update media items from time to time by adding new tracks. Although the authoring server 410 and distribution server 420 are illustrated as separate devices in FIG. 4, implementations may vary. In some applications, it may be convenient to operate a single server device as both an authoring server and a distribution server while, in other applications (particularly large scale distribution environments), it may be convenient to provide a network of multiple server devices to operate as the distribution server 420 and/or the authoring server 410. Such implementation details are immaterial to the present discussion unless described otherwise herein.

FIG. 4 illustrates exemplary operations that may be performed on a media file 120 over its lifecycle. As discussed, authors of media files initially may create a media file 120 with a first set of tracks 124.1-124.N and alternate groups 126.1-126.3. Thus, in FIG. 4, an authoring server 410 may create a first representation of the media 120, which may be released to the distribution server 420 and stored 425 for download and delivery to client devices (not shown).

At some point during the lifecycle of the media item 120, an author of the media item may determine to supplement one or more representations of the media item 120, for example, by adding audio track(s), adding subtitle track(s) or add a new type of content for the media item altogether. In such an event, the authoring server 410 may create a new track 124.N+1 for the media item, which may be stored to the copy of the media item resident in storage 425 on the distribution server 420. Thus, where other techniques may have required creation of a wholly new media item (not shown), the techniques of the present disclosure permit the media item 120 to be supplemented with new content.

As discussed, the principles of the present disclosure allow "legacy" tracks to coexist with newer tracks on a distribution server 110. The proposed techniques describe operation of a client device in response to the following issues:

How does a track advertise that it is a candidate for use, and conversely that it should not be used?

How does a movie contain multiple tracks and the runtime find the best track to use?

How does this work on a legacy version of the runtime where there is no support for the mechanisms introduced here for (1) and (2)?

These approaches are discussed hereinbelow.

1.1 Advertising a Track is a Candidate for Use

Currently, if a track is of a handler type and has a codec that Core Media understands, the track is considered usable. If the track is part of an alternate group, it can be selected for presentation based upon aspects of the track such as language tagging and media characteristics evaluated against user preferences or other client configuration. If two tracks are otherwise equal—in effect "tied"—the order of tracks in the movie resource is used and the earlier one presented.

For tracks in an alternate group that would not otherwise be differentiated (e.g., same language, same characteristics), later tracks in track order would never get considered. However, later tracks may use additional features that would be preferred in the current runtime. A track author likely wants to take advantage of new format features and have richer tracks be preferred on platforms supporting those features.

Later in time, even more features could be introduced, perhaps resulting in a desire for three versions of the track, each optimized for a particular runtime version.

Instead of trying to differentiate by something like a version number, feature tags (described here) can be added to a track and interpreted by the playback mechanism to identify if the track can be used on the current runtime. If a track advertises any unrecognized feature tags, it is excluded from candidacy for use. If a track advertises no feature tags (as all "legacy" tracks currently do), it is considered a candidate. By using this new advertising mechanism, tracks can signal their requirements for use. Moreover, new feature tags can be introduced without requiring understanding other feature tags or trying to maintain some consistent versioning regime. Tracks should signal their requirements, at whatever granularity is suitable. If a track so authored is copied between media files, this requirements information remains valid because the information is part of the track.

The described mechanism suffices to know if a track can be considered for use. It is binary in its answer—yes or no. Finding the best track however involves additional mechanisms described in the next section.

1.2 Signaling a Change in Track Alternate Group Membership when Track is a Candidate for Use Determining a track is a candidate for use is a part of this proposal. Acting upon the suitability so a track is available for selection either automatically or by the user is another.

The idea proposed here is that a track's alternate group assignment can change based upon the evaluation of its suitability for the current runtime. This allows a track with features that are not universally supported to be authored outside of any alternate groups (e.g., the legible alternate group which the group that can contain subtitle, closed caption and WebVTT text tracks). A player device unaware of the mechanisms proposed here would ignore this track as the legible alternate group does not contain it and so the track would not be offered. For a player device aware of the proposed mechanisms, the track outside can provisionally be reassigned to the legible alternate group and then be offered. This makes track alternate groups dynamic, morphing to adapt to the feature requirements of tracks in the movie.

As only tracks suitable for the runtime become part of the alternate group, there is no additional need to evaluate the requirements-based candidacy in walking the alternate group tracks.

It is expected that tracks authored to be in the alternate group (i.e., TrackHeader alternate group being non-zero) may remain in the alternate group. They should be compatible with runtimes universally or be able to be vetted against the runtime by considering their codec or other dynamic behavior such as is used for AC-3 audio connections.

As described, the tracks outside the authored alternate group may provisionally be included in the alternate group. While less obvious, it is possible to use the mechanism to author a movie with no tracks in an alternate group but have provisional tracks that get added to the non-existent group and by doing so synthesize a new alternate group.

1.3 Finding the Best Track to Use Among a Set of Otherwise Equivalent Tracks After alternate group memberships are evaluated, there may still be two or more tracks that would otherwise be considered equivalent. Some of the tracks may have been authored in the alternate group and others may be provisional so they may get assigned to the alternate group. There should be a way to order them from most universally playable to increasingly richer or preferable forms. Content authors should be able to direct this preference consideration.

This mechanism would not be required unless the possibility exists that more than one equivalent track would be left in the alternate group after feature evaluation completes.

In an embodiment, this could be accomplished by building a chain of links connecting the most compatible (universally playable) track to increasingly preferred tracks. This chain would be ordered so it starts with the universal one and ends with the most preferred with potentially many intermediate ones. In the simplest case, it might consist of the universal one and a single preferred one. If there is more than one version of the runtime that might encounter the movie file, the chain might be longer.

In an embodiment, the "fallback" track reference mechanism ('fall' track reference) already employed in the file format for connecting AC-3 to its fallback AAC may be reused. The most universal track (typically in the movie's authored alternate group) may be the fallback target of a track that may require evaluation or might fail to be suitable for other runtime reasons.

To date, all fallbacks of a particular kind (e.g., legible, audio) have been in the same alternate group. This proposal introduces the idea that a provisional track (authored outside the alternate group with requirement tagging) may have a fallback track reference to a track within the authored alternate group. Moreover, other provisional tracks (outside the alternate group) may have fallback track references to other provisional tracks.

In this way, a chain may be constructed from provisional tracks into the tracks in the alternate group. By evaluating this in reverse and working from the ultimate target of all fallback track references to the other end, it is possible to find the most preferred track.

Because in walking this chain some tracks after feature evaluation might not be assigned to the alternate group, a reader should be prepared to walk the chain but ignore tracks that are not currently assigned to the alternate group. This means that there may be "holes" in the chain that should be skipped. The fallback track references from such tracks still may be valid.

For purposes of simplifying reader implementation, the chain is proposed as a singly linked chain, not a tree. In another embodiment, a tree could be implemented by having more than one track reference originating in a track.

1.4 Backwards Compatibility

For backwards compatibility on runtimes without any support for the feature evaluation, the movie can contain an authored alternate group. All tracks unsuitable for the runtime will be authored as provisional tracks and therefore be outside the alternate group. Legacy readers may not see these provisional tracks and so may not need to fend them off.

2. Design Details

This section looks at file format details of how this might be implemented.

2.1 File Format Support for Advertising a Track is a Candidate for Use

The proposal involves introducing a mechanism for a track to signal a set of requirements on the playback runtime that would be satisfied for the track to be considered for playback selection. This proposal describes how the signaling works and how it is stored in the movie file format(s).

These track runtime requirements can be seen as features or other characteristics that should be evaluated by the runtime. Following the model of tagged media characteristics (using the 'tagc' user data item), one or more feature tags in the form of reverse DNS style strings should be able to be added to the track.

The authoring process should be straightforward, allowing tags to be added without having to re-encode file media. Likewise it should be straightforward to remove track selection tags in whole or in part without re-encoding file media.

While this design is generalizable, this proposal considers only the addition to the WebVTT text track format. The additions themselves could be standardized so the information could be added to arbitrary tracks. As the approach uses sample entry extensions (a.k.a., sample description extensions), it has a requirement the track have sample entries that allow extensions.

2.1.1 Sample Entry Extension Signaling Required Features 2.1.1.1 File Format Extensions The proposed techniques may introduce an optional box into the WebVTT-specific WVTTSampleEntry sample entry (a.k.a., SampleDescription in the QuickTime File Format specification) that holds the collection of track selection feature tags to be considered when determining if the track should be considered for use:

```
aligned(8) class WVTTSampleEntry( ) extends PlainTextSampleEntry
('wvtt'){
    WebVTTConfigurationBoxconfig;// required (box type == 'vttC')
    WebVTTSourceLabelBoxlabel;// recommended(box type == 'vlab')
    RequiredFeaturesBox required_features;// optional(box type ==
    'rqdf')
    MPEG4BitRateBox ( ); // optional
}
```

The new RequiredFeaturesBox is the new container and is described in the next section.

The order of and set of boxes within WVTTSampleEntry is not prescribed.

2.1.1.1.1 RequiredFeaturesBox

RequiredFeaturesBox is an optional Box holding children boxes for each associated required feature to consider. If there are no required features, there should be no RequiredFeaturesBox.

The children boxes of RequiredFeaturesBox each represent a single feature to be tested by the playback runtime. The RequiredFeaturesBox is a Box of type 'rqdf' (for "required features") defined as:

```
aligned(8) class RequiredFeaturesBox( ) extends Box ('rqdf') {
    MediaFeatureBox( ) [ ];// one or more feature boxes, each
    representing a different required feature
}
```

RequiredFeaturesBox contains one or more MediaFeatureBoxes, one for each feature the runtime supports.

Readers determining runtime candidacy process all children boxes of type MediaFeatureBox within RequiredFeaturesBox and evaluate if they recognize the feature tag and also implement the feature indicated by the feature tag. If the reader does not recognize the tag in the MediaFeatureBox, the reader should consider the track unsuitable for selection. If the RequiredFeaturesBox contains Boxes of any other type than MediaFeatureBox or FreeBox, the reader should consider the track unsuitable for selection. Otherwise, the track is considered a candidate.

FreeBoxes (boxes of type 'free') are allowed as children boxes of RequiredFeaturesBox so that free space can be reserved in the RequiredFeaturesBox. Other boxes may be introduced that signal requirements in new ways. By having a reader treat unrecognized boxes as indicating the track should be considered unsuitable for use, this allows those additional boxes to work with newer players but not interrupt performance of older players that do not recognize the new formats.

2.1.1.1.2 MediaFeatureBox

A MediaFeatureBox is a Box of type 'feat' holding a tag as a string that signals a feature the runtime should understand and implement. Additional box types may be introduced in the future.

```
aligned(8) class MediaFeatureBox( ) extends Box ('feat') {
    string feature_tag_value;
}
``` feature_tag_value is the UTF-8 encoded byte string holding the public or private track feature tag string The string is not nul ('\0') terminated. The MediaFeatureBox's size determines the length of the string.

The track selection feature tag atom's payload data is a tag that indicates something to evaluate about the content. This is a specialized string consisting of a subset of US-ASCII (7 bits plus a clear high bit) characters and conforming to the structure described in the following paragraphs. This is not a C string; there is no terminating null ('\0')1, so the number of characters is determined from the atom's size. Legal characters are alphabetic (A-Z, a-z), digits (0-9), dash (-), period (.), underscore (_), and tilde (~).

If desired, comparison of tags may be made case sensitive; two tags would match if the bytes of the strings match exactly. Two tag strings differing only by case should not be used so as to avoid possible confusion for developers or content creators.

Duplicate tags in a RequiredFeaturesBox are allowed but are discouraged. Duplication has no special meaning.

Tag strings are not localized and are meant to be machine interpreted; however, mnemonic strings are encouraged.

This identifier string is not presented to the end user but will likely be seen by developers working with the format.

If clients want a display string for the name and/or description of the feature tag, the feature tag string can be used to lookup a localized user-readable name. It is imagined a registry of names and descriptions in various languages for registered feature tag identifiers could be established and client apps or frameworks could include these localized resources in their implementations.

2.1.1.1.3 TrackGroupAssignmentBox

TrackBoxes ('trak') may optionally carry a new child box called a TrackGroupAssignmentBox that can be used to change the assignment of the track to a track alternate group based upon the evaluation of a feature requirements predicate. If present, the TrackGroupAssignmentBox is used to indicate the new effective track alternate group. If this machinery is not executed, the alternate_group assignment in the TrackBox is used. In this way, there is no behavioral change unless explicit evaluation occurs.

```
aligned(8) class TrackGroupAssignmentBox
    extends FullBox('tgas', 0, flags){
    int(16) to_alternate_group;
}
```

TrackGroupAssignmentBox is a FullBox of type 'tgas' having these fields:

to_alternate_group The alternate track group value is used as the track's new alternate group if the feature requirements predicate evaluates to true.

The to_alternate_group field corresponds to an alternate group identifier of an existing alternate group containing tracks, of 0 indicating no alternate group membership, or of a new alternate track group identifier not currently used. While not disallowed, the value should not hold the value currently held in the track's current TrackHeaderBox alternate_group value as this would indicate reassignment to the same alternate group.

Entering an alternate group involves setting to_alternate_group to the same value as that found in the TrackHeaderBox alternate_group field of a track already in that group.

Synthesizing a new alternate group involves setting to_alternate_group to a value found in no track's TrackHeaderBox's alternate_group field.

If the feature requirements predicate evaluates to true, the value of to_alternate_group is used as the new effective track alternate group for the track. If the feature requirements predicate evaluates to false, there is no change in the effective alternate group assignment for the track. The value of the TrackHeader's alternate_group remains fixed, as authored.

The TrackGroupAssignmentBox should not be included if to_alternate_group holds the same value as the TrackHeader's alternate_group field. In other words, writers should not write TrackGroupAssignmentBoxes where the to_alternate_group is the same as the TrackHeaderBox alternate_group.

2.1.1.1.4 Fallback Track Reference Type

This proposal does not introduce a new track reference type but instead reuses the fallback ('fall') track reference to build the chain used to evaluate priority of tracks that otherwise would be the same (or tie). Tracks that may not be usable on a runtime can have a fallback track reference to a less preferred track that may. This new track in turn may have a fallback to another track until the last track which does not have a fallback track reference.

Because candidate tracks for inclusion in the alternate group may be outside the alternate group, want to be part of this fallback chain, and provisionally be evaluated to become part of the alternate group, a runtime walking the fallback chain should be prepared to ignore tracks outside the alternate group while continuing to follow the entire fallback chain.

Runtimes should be able to navigate the entirety of the fallback chain, which may require looking at all tracks in the movie and identifying membership in different chains.

2.1.1.2 Feature Tag Identifiers

The following sub-section discusses the design of the identifier string. It is based upon the specification for tagged media characteristic identifier tags documented in the QuickTIme File Format specification.

2.1.1.2.1 Tag Identifier String Structure and Character Set

The MediaFeatureBox's feature_tag_value is typed as an UTF-8 string allowing it to carry Unicode text. The feature_tag_value is the bytes of the string without leading counts or terminating null ('\0'). At the same time, this text isn't meant to be end user visible, mostly useful to developers and content authors.

2.1.1.2.2 Tag Strings are Compared as Bytes

The present discussion describes the strings being compared as octets (i.e., bytes). This has the advantage that comparison is very easy, a simple byte-for-byte memory comparison. It has the disadvantage that authors might accidentally use a string differing only in case (e.g., using "com.apple.iTunes.SnazzyNewFeature" instead of "com.apple.tunes.snazzy-new-feature") and find clients in the field don't see their tags. Nevertheless, the benefits probably outweigh the accidental authoring possibility. It is also the same semantic as used with media characteristic tags already used in the movie file format(s).

Limiting the track tag strings to the reduced US-ASCII repertoire mitigates issues that might otherwise arise from arbitrary Unicode comparisons.

2.1.1.2.3 Multiple Identical Strings are Allowed

In an embodiment, the same track tag may be stored in the RequiredFeaturesBox. Doing so does not impose on an editor a responsibility to guarantee uniqueness. This means that combining two collections of feature tags is pretty much combining the children MediaFeatureBoxes instead of selectively moving a subset and having to cull duplicates.

So, readers need not treat a duplicate as somehow interesting. They may look for the presence of a tag and upon finding it the first time will be satisfied. Moreover, if the reader recognizes or doesn't recognize the first instance of a duplicated tag, the same behavior may apply to later duplicates. So, there need not be a behavioral effect of duplication. Regarding writers, duplicates may be culled but it is not required.

2.1.1.2.4 Defining Tag Strings

This document doesn't currently define the structure of track selection feature tag strings or present a preliminary set of public tags. It does suggest a prefix of "public." for publicly registered tags and the use of reverse DNS for private (or ad hoc) tags. An extensible structure may be provided for tags and building an initial set of public and perhaps private tags.

The registry for this might be in a header file (e.g., a .h file) or someplace more formal. It would be documented.

It is possible to have private track selection feature tags that only the author and runtime understand. This may be a temporary circumstance and these tags defined more publicly in the future.

2.1.2 File Format Support for Finding the Best Track to Use Among a Set of Otherwise Equivalent Tracks The track reference of type 'fall' (for "fallback") may be reused to signal the connection from the most preferred to the next most preferred track. This in turn may be connected to its next most preferred, continuing until there are no more fallbacks. This builds a chain of tracks, perhaps as few as two (2) but possibly more. By walking from the track with no fallbacks toward the ultimate track at the end of the fallback track (in the reverse direction of fallbacks), it's possible to determine the most preferred. If all tracks were in the alternate group, this track would be used. However, with provisional tracks, some of the tracks in the fallback may remain outside the alternate group and so should be ignored.

Track feature evaluation and track alternate group reassignment may have occurred so only tracks that are suitable for the current runtime will be in the alternate group. Tracks outside the alternate group need not be considered for playback but may be visited in determine the chain itself.

Code processing equivalent tracks still in the alternate group should treat each as a candidate. If the track has an outbound 'fall' track reference (i.e., its fallback is outside the alternate group), the chain of tracks should be followed until either a track also in the alternate group is found or the set of track references is exhausted.

During chain walking, tracks both inside and outside of the current alternate group may be visited. Readers should ignore tracks outside the alternate group for all purposes other than to retrieve that track's 'fall' track reference to continue walking the chain.

A movie may be authored so there is no authored group alternate and executed on a runtime where no provisional tracks are added to an alternate group (i.e., their feature evaluation failed). Runtimes should be prepared to offer no tracks of a particular category (e.g., audio, legible) if the alternate group produced is empty.

It can be advantageous to avoid creation of track reference cycles. Also, client devices may be provisioned to detect such cycles when evaluating chains.

2.1.3 File Format Support for Backwards Compatibility

There are no additional structures introduced for backwards compatibility. Instead backwards compatibility is accomplished by doing the following:

including in the authored alternate group only tracks playing on legacy runtimes authoring provisional tracks outside this alternate group while using feature tags, track alternate group assignment, and fallback track references to have these tracks enter the alternate group if supported on the runtime and prioritize the tracks' usage.

On runtimes that are unaware of the track alternate group reassignment and evaluation mechanisms just described, a track requiring runtime features may remain outside the alternate group and therefore not be offered for selection.

3. Guidelines for Authors and Distributors of Media Files and Player Developers

The principles of the present disclosure are expected to relieve the burden of maintaining media files for authors and distributors of those files. With use of the techniques disclosed above, a single media item may be represented by a single media file, even as tracks are added to the media file to support an ever-increasing array of new media players. It is not required to develop multiple versions of media files for delivery to different players. Thus, the present techniques are expected to reduce storage costs and production costs for such content.

The foregoing techniques are expected to simplify implementation of players as well. Player developers may design their players to recognize feature tags according to a vocabulary of such tags. Thus, the players can compare the tags to their own capabilities to determine whether the player can render an associated track. Players need not look into content of the tracks themselves; for example, they need not be programmed to recognize the coding syntaxes of the tracks to determine whether those tracks are playable.

Figure 5:
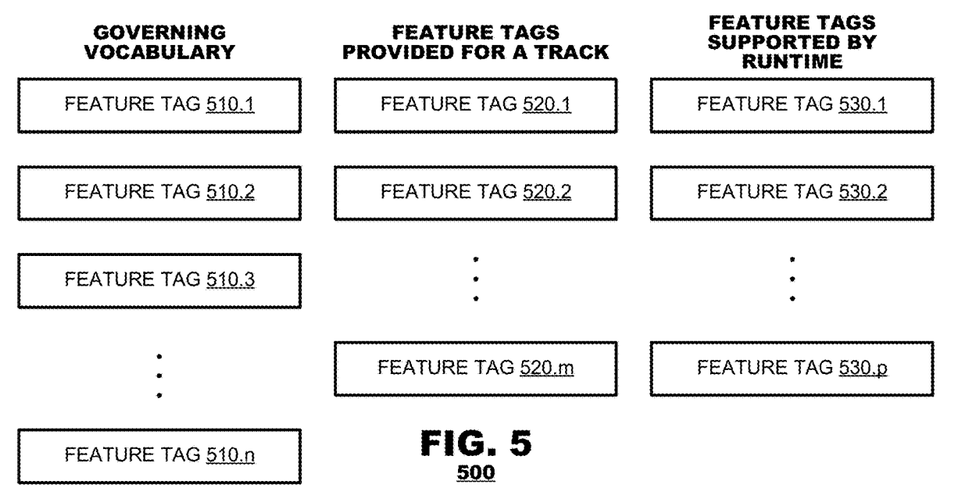
FIG. 5 illustrates relationships among feature tags in a vocabulary, feature tags assigned to a track, and feature tags supported by a runtime according to an embodiment of the present disclosure.

FIG. 5 illustrates relationships 500 among feature tags 510.1-510.$n$ in a vocabulary, feature tags assigned to a track 520.1-520.$m$, and feature tags supported by a runtime 530.1-530.$p$.

The principles of the present disclosure also apply to media streaming applications. Track alternate groups could be modeled for streaming, for example, as variants.

The following guidelines may be useful for authors and/or distributors of media files as they work with feature tags and provisional alternate tracks:

A track may be marked as a provisional track. A track however need not be marked as a provisional track. Unmarked tracks may be treated as they would be prior to advent of the techniques described herein.

A media file may consist of zero or more non-provisional and zero or more provisional tracks.

Different tracks can have different features (feature requirements) or can have zero features attached to them. "Legacy" tracks have no features attached to them.

A track with no associated features but including track group assignment information is considered a candidate for track alternate group assignment. At a high level, runtimes may operate according to a rule: "does runtime understand all the features of a given track?" As a runtime would determine that there are no unknown features if no feature tags are provided with a track, the rule would evaluate to true for a track without feature tags and allow the track as a candidate.

Features can embody policy or content author intent and may be disconnected from capabilities of the runtime.

One or more vocabularies of feature tags may be defined, perhaps differing because of future additions or additions unknown to the creator of the first vocabulary. For players with network accessibility, vocabulary definitions may be maintained at a network location for retrieval by players.

Devices, players, etc. that can render portions of a media file sometimes are called "runtimes" hereinabove. Runtimes have support for features:

A runtime can support no features (i.e., it has not adopted the support for provisional tracks), in which case it may operate as a "legacy" runtime, one that operates without the benefits of the techniques described herein.

A runtime can have fewer features than all features defined under a governing vocabulary (i.e., it supports provisional tracks but only a limited set of features).

A runtime can have more features than all features defined under a governing vocabulary (i.e., it supports provisional tracks but the features is a proper superset where some features may come from another vocabulary or a future version of the vocabulary already supported)

The same media file:

can be delivered to a past runtime with no support for provisional tracks because such tracks are not part of an authored static alternate group (i.e., they would be ignored);

can be delivered to a future runtime that can exclude tracks with unsupported features or consider tracks having features that are all known to the future runtime; and can be delivered to current runtimes where different runtimes might offer differing tracks based upon the features known to the respective runtimes.

Regarding production workflow, media file authors can annotate content as part of a workflow with additional feature tags and track group assignment information. This allows provisional track annotation to be done as a step in a larger workflow (sometime before final delivery).

These techniques provide flexibility to create a media file from legacy content. Specifically, an author can create a media file where all tracks are initially assigned to static alternate groups with no use of provisional tracks and then tracks updated to be removed from its static alternate group and assigned feature and track group assignment information thereby making them provisional tracks. This allows existing content to be "lightly re-authored" so that it can be delivered to earlier runtimes by marking tracks a provisional that include features unsupported on earlier runtimes. Note that there's no re-encoding of the media, just modification of the provisional assignment related information.

While the focus here is on single media files, the ideas are generalizable to multiple file delivery.

4. Conclusion

This spec attempts to define extensions to the QuickTime and ISO Base Media File Format movie file formats allowing control of selection among otherwise identical tracks (i.e., upon language and other currently considered state such as media characteristics). The mechanism introduces track feature requirements information and describes how it is stored in a track's sample entries. It also describes how a track can be assigned a new track alternate group based upon the evaluation of these requirements. Ideally, the approach can allow the same media file to play on legacy devices and on progressively richer runtimes.

5. Implementation

Figure 6:
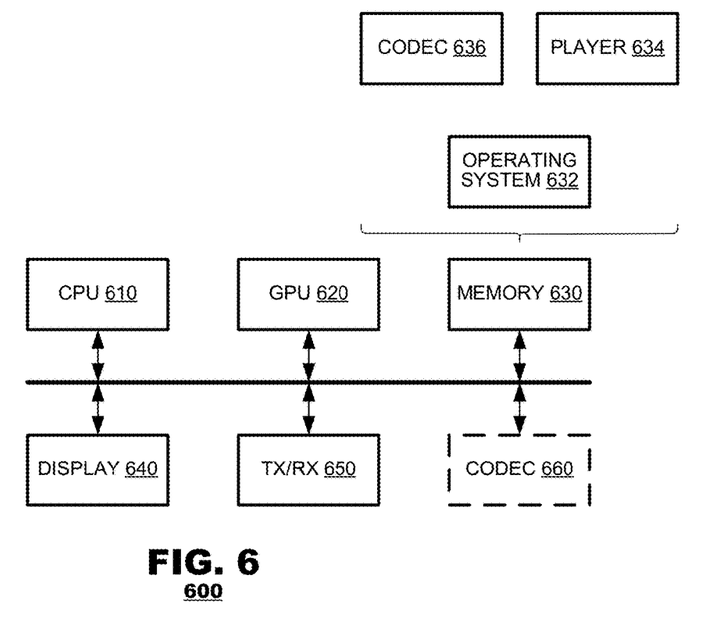
FIG. 6 is a simplified block diagram schematic view of a client terminal according to an embodiment of the present disclosure.

FIG. 6 is a simplified block diagram schematic view of a client terminal 600 according to an embodiment of the present disclosure. Client device 600 may include a CPU 610, GPU 620, A memory system 630, a display 640, a transceiver 650 and a codec 660 provided in communication with each other.

The CPU 610 may control the operation of components within client device 600. The CPU 610 may execute program instructions stored by the memory system 630, which may define an operating system 632 of the terminal and various tools and program applications, such as a player application 634 and/or codec 636. The player application 634 may manage download and display of media items. The codec 636 may decode coded data representing video and/or audio content of the media item. In some applications, rather than provide the codec 636 as program instructions, it may be convenient to provide the codec 660 as a hardware device (shown in phantom in FIG. 6).

In the various implementations, the memory system 630 may include one or more storage mediums, including for example, a hard-drive, flash memory, permanent memory such as read-only memory ("ROM"), semi-permanent memory such as random access memory ("RAM"), any other suitable type of storage component, or any combination thereof. The memory system 630 may include cache memory, which may be one or more different types of memory used for temporarily storing data for electronic device applications.

The transceiver 650 may enable the client terminal 600 to communicate with other electronic devices (such as the distribution server 110) using a communications protocol. For example, transceiver 650 may support Wi-Fi (e.g., an 802.11 protocol), Ethernet, Bluetooth, high frequency systems (e.g., 900 MHz, 3.4 GHz, and 5.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

The electronic device 600 may also include one or more output components including display(s) 640. Output components may render information (e.g., audio and video) to a user of device 600. An output component of client device 600 may take various forms, including, but not limited, to audio speakers, headphones, visual displays, etc. For example, display 640 may include any suitable type of display or interface for presenting visible information to a user of client device 600. In some embodiments, display 640 may include an embedded or coupled display. Display 640 may include, for example, a touch screen, a liquid crystal display ("LCD"), a light emitting diode ("LED") display, an organic light-emitting diode ("OLED") display, or any other suitable type of display.

In some embodiments, one or more components of electronic device 600 may be combined or omitted. Moreover, electronic device 600 may include additional components not depicted in FIG. 6. Client device 600 may be any stationary or portable electronic device, including tablet computers, smartphones, laptop computers, personal computers, set-top boxes, wearable electronic devices, and other consumer electronic products designed to execute graphics applications.

It will be apparent to those skilled in the art that various modifications and variations can be made in the systems and methods for automatically determining a region of influence of the present disclosure without departing from the spirit or scope of the disclosure.

We claim:

1. A method of rendering a type of content from a file of a media item, comprising:
    identifying, from the file of the media item, track(s) in a group data structure, corresponding to the type of content, as candidate track(s);
    determining, from other tracks in the file, whether another track corresponds to the type of content;
    when another track corresponds to the type of content, comparing feature tags in the file that are associated with the other track to capabilities of a player device that will render the type of content, and, if the feature tags match capabilities of the player device, including the other track in the group data structure as a candidate track;
    selecting a track from the candidate tracks for rendering; and
    rendering the selected track by the player device.

2. The method of claim 1, wherein the group data structure identifies a plurality of tracks that are alternatives for each other during rendering.

3. The method of claim 2, wherein the group data structure identifies alternative audio tracks.

4. The method of claim 2, wherein the group data structure identifies alternative subtitle tracks.

5. The method of claim 2, wherein the group data structure identifies alternative closed caption tracks.

6. The method of claim 1, wherein the selecting is made by an operator of the player device.

7. The method of claim 1, wherein the selecting is made by the player device based on playback settings stored for the player device.

8. The method of claim 1, wherein the selecting is made based on an indication of priority in the file.

9. The method of claim 1, wherein a feature tag of a track represents a coding protocol applied to content of the respective track.

10. A non-transitional computer readable medium storing program instructions that, when executed by a processing device, cause the device to:
    identify, from a file of a media item, track(s) in a group data structure, corresponding to a type of content, as candidate track(s);
    determine, from other tracks in the file, whether another track corresponds to the type of contents;
    when another track corresponds to the type of content, compare feature tags in the file that are associated with the other track to capabilities of a player device that will render the type of content, and, if the feature tags match capabilities of the player device, including the other track in the group data structure as a candidate track;
    select a track from the candidate tracks for rendering; and
    render the selected track by the player device.

11. The medium of claim 10, wherein the group data structure identifies a plurality of tracks that are alternatives for each other during rendering.

12. The method of claim 11, wherein the group data structure identifies alternative audio tracks.

13. The method of claim 11, wherein the group data structure identifies alternative subtitle tracks.

14. The method of claim 11, wherein the group data structure identifies alternative closed caption tracks.

15. The medium of claim 10, wherein the selecting is made by an operator of the player device.

16. The medium of claim 10, wherein the selecting is made by the player device based on playback settings stored for the player device.

17. The medium of claim 10, wherein the selecting is made based on an indication of priority in the file.

18. A player device, comprising:
storage to store a file representing a media item for rendering;
a codec for decoding coded media data; and
a processor to:
identify, from the file of the media item, track(s) in a group data structure, corresponding to a type of content, as candidate track(s),
determine, from other tracks in the file, whether another track corresponds to the type of content,
when another track corresponds to the type of content, compare feature tags in the file that are associated with the other track to capabilities of the player device, and, if the feature tags match capabilities of the player device, including the other track in the group data structure as a candidate track,
select a track from the candidate tracks for rendering, and render the selected track by the codec.

19. The device of claim 18, wherein the group data structure identifies a plurality of tracks that are alternatives for each other during rendering.

20. The method of claim 19, wherein the group data structure identifies alternative audio tracks.

21. The method of claim 19, wherein the group data structure identifies alternative subtitle tracks.

22. The method of claim 19, wherein the group data structure identifies alternative closed caption tracks.

23. The device of claim 18, wherein the selecting is made by an operator of the player device.

24. The device of claim 18, wherein the selecting is made by the processor based on playback settings stored for the player device.

25. The device of claim 18, wherein the selecting is made by the processor based on an indication of priority in the file.

* * * * *